Patented Nov. 15, 1938

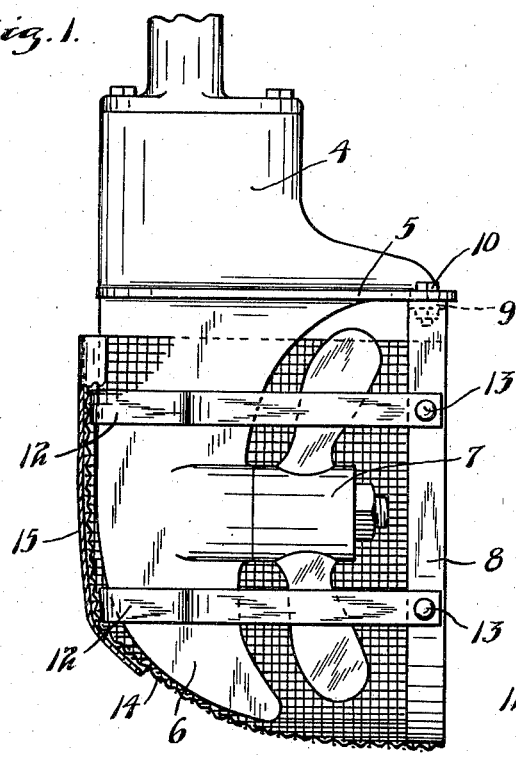
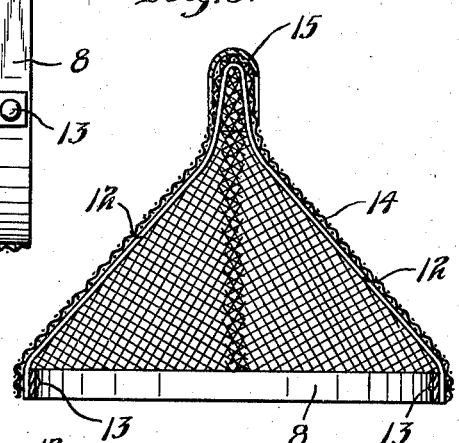
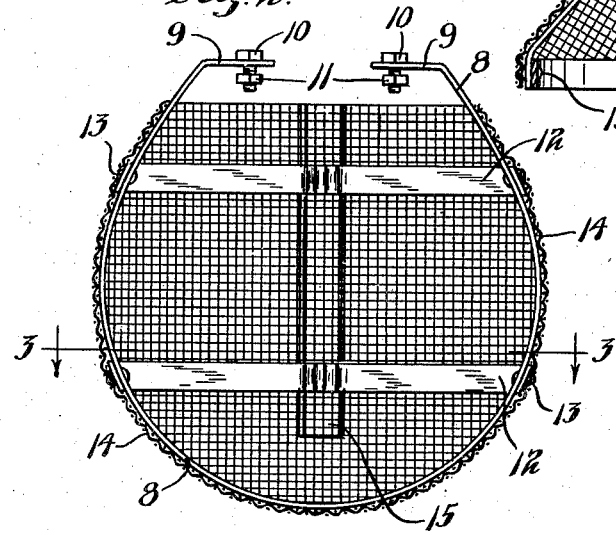

2,136,628

UNITED STATES PATENT OFFICE 2,136,628

PROPELLER AND RUDDER GUARD FOR OUTBOARD MOTORS

Alvin C. Lundell, Minneapolis, Minn.

Application August 2, 1937, Serial No. 156,972

4 Claims. (Cl. 115—42)

This invention relates to devices for guarding boat motor propellers against becoming entangled in weeds and the like and is particularly adaptable for use with portable outboard motors.

The device is of particular advantage for use when the motor is idled down when trolling for fish, at which time there is often danger that the fishing lines of the occupants of the boat may become entangled in the rotating propeller.

It is, therefore, a general object of my invention to provide a propeller guard which will not only effectively prevent weeds and fishing lines from wrapping around the propeller, but one which will also remain substantially clear at all times and will not accumulate masses of weeds thereon and interfere with proper functioning of the propeller.

Another object of the invention is to provide a propeller and rudder guard which will be firmly held in proper position by a minimum number of fastening elements and which can be quickly secured and removed.

These and other objects and advantages of the invention will be more fully set forth in the following description made in connection with the accompanying drawing, wherein like reference characters refer to the same and similar parts of the invention throughout the several views, and in which—

Fig. 1 is a side elevation of the lower portion of an outboard motor assembly showing the lower gear case, propeller and skeg, with the guard element partially broken away;

Fig. 2 is a rear elevation of the guard element alone, and

Fig. 3 is a transverse section taken on the line 3—3 of Fig. 2.

In the particular embodiment of my invention shown in the drawing, there is illustrated the lower portion of an outboard motor including the gear case 4, anti-cavitation plate 5, skeg 6, and propeller 7. The guard element is adapted to fit around the lower portion of the gear case 4, the skeg 6 and the propeller to prevent weeds, fishing lines and other things which might possibly become entangled from reaching said propeller.

The guard element itself includes a more or less U-shaped back frame element 8 whose upper ends 9 are bent to a horizontal position as best shown in Fig. 2. The upper ends 9 are provided with openings adapted to receive bolts 10 which also extend through apertures provided through the rear portion of the anti-cavitation plate 5 on each side of the gear box 4 and just above the propeller. Nuts 11 hold the frame element 8 rigidly against the under side of the cavitation plate. Extending forwardly from the rear frame element 8 is a pair of substantially V-shaped horizontal frame members 12. The frame members 12 are secured at their rear ends to the rear frame member 8 by any suitable means such as rivets 13. It will be noted particularly in Fig. 3 that the extreme forward portions of the horizontal frame members 12 are bent to form relatively deep, narrow pockets or recesses. The material from which the frame elements 12 are made is such that these deep forward V-shaped portions are slightly flexible so that they will fit around the relatively sharp forward edge of the lower portion of the gear box which merges at its bottom with the forward and under edge of the skeg 6. Thus there is a gripping action of the frame elements 12 with respect to said gear box and skeg and the normal force of the water against the guard unit keeps said unit pushed firmly against the forward edge of said gear box and skeg.

From the foregoing it will be seen that the guard may be quickly applied by slipping it over the lower portion of the motor assembly and inserting and securing the two bolts 10 through the anti-cavitation plate 5 and the upper ends 9 of the rear frame member 8. A covering of wire mesh 14 is shaped over the frame of the guard and secured by any suitable means such as soldering or riveting, and it is preferred that the wire be formed to substantially follow the curve of the forward edges of the gear box and the skeg. Finally there is a V-shaped strip 15 bent to a relatively sharp angle and applied to the forward portion of the guard over the wire mesh 14. This forward strip causes the device to cut the water sharply and greatly assists in causing weeds and fishing lines and the like to glance off or slide past the guard without catching thereon.

The particular shape of the guard, as best brought out in Fig. 3, is of special importance. The extreme forward portion of the guard is relatively narrow to provide the gripping action of said forward portion against the lower portion of the motor housing, this sharp forward portion also cuts the water readily and the main side portions of the guard diverge rearwardly at an angle which is very unlikely to permit anything to lodge thereon and obstruct the flow of water through the wire mesh cover. The device may be easily and cheaply constructed, it may be quickly applied to a motor, and it is so shaped that it follows the general contour of the lower part of the motor assembly and thus provides a very compact structure.

It will, of course, be understood that various changes may be made in the form, details, arrangement and proportions of the various parts without departing from the scope of my invention.

What is claimed is:

1. In a propeller guard for outboard motors and the like, a frame, an open work cover over the forward and side portions of said frame, and lying around the front and sides of the propeller of said motor, the rear portion of said frame and cover being entirely unobstructed rearwardly from said propeller, the sides of said guard converging forwardly relatively abruptly to a point near the forward edge of said guard, and then converging forwardly more gradually to provide a relatively sharp pocket for receiving and engaging the lower forward portion of said motor assembly.

2. In a propeller guard for outboard motors and the like, wherein the lower portion of the motor includes a gear box and a skeg, each of which has a relatively sharp forward edge, a guard frame comprising a substantially U-shaped rear guard member secured at its upper ends to a portion of said motor housing, a horizontal substantially V-shaped frame element extending forwardly from said rear frame element, the forward portion of said horizontal frame element being shaped to conform to the contour of the forward edges of said gear box and said skeg, and frictionally engage the same, a wire mesh cover over said frame from the front thereof to said rear frame member and conforming to the shape of said horizontal frame element, and a smooth weed deflecting element lying along the sharp forward edge of said guard.

3. In a propeller guard for outboard motors and the like, a frame, an open work cover over said frame, the forward portion of said frame and cover being formed in substantially V-shape and being slightly resilient whereby said guard can be wedged firmly over the lower forward portion of said motor assembly, and said guard converging rearwardly to points laterally of and at least as far back as the rear of said motor assembly.

4. The structure in claim 3 and a longitudinally angular vertical strip along the edge of said V-shaped portion of the guard.

ALVIN C. LUNDELL.